United States Patent
Anson et al.

(10) Patent No.: US 7,433,967 B2
(45) Date of Patent: Oct. 7, 2008

(54) METHOD AND SYSTEM FOR ROUTING SMS MESSAGES

(75) Inventors: David L. Anson, Bellevue, WA (US); Roman Sherman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 09/788,329

(22) Filed: Feb. 16, 2001

(65) Prior Publication Data
US 2002/0116524 A1 Aug. 22, 2002

(51) Int. Cl.
*G06F 15/173* (2006.01)
*H04Q 7/20* (2006.01)

(52) U.S. Cl. .................. 709/240; 709/221; 709/238; 709/239; 455/466; 455/556.2

(58) Field of Classification Search ......... 709/238–242, 709/221; 379/221.01–221.02, 221.06; 455/466, 455/556.2
See application file for complete search history.

(56) References Cited

U.S. PATENT DOCUMENTS

| | | | | |
|---|---|---|---|---|
| 5,457,680 A * | 10/1995 | Kamm et al. | ............... | 370/332 |
| 5,628,051 A * | 5/1997 | Salin | ........................ | 455/433 |
| 5,828,847 A * | 10/1998 | Gehr et al. | .................. | 709/239 |
| 6,101,320 A * | 8/2000 | Schuetze et al. | ............ | 709/206 |
| 6,119,014 A * | 9/2000 | Alperovich et al. | ......... | 455/466 |
| 6,188,909 B1 * | 2/2001 | Alanara et al. | .............. | 455/466 |
| 6,212,550 B1 * | 4/2001 | Segur | ........................ | 709/206 |
| 6,292,668 B1 * | 9/2001 | Alanara et al. | .............. | 455/466 |
| 6,292,669 B1 * | 9/2001 | Meuronen et al. | ............ | 455/466 |
| 6,333,937 B1 * | 12/2001 | Ryan | .......................... | 370/468 |
| 6,400,958 B1 * | 6/2002 | Isomursu et al. | ............ | 455/466 |
| 6,442,159 B2 * | 8/2002 | Josse et al. | .................. | 370/354 |
| 6,560,456 B1 * | 5/2003 | Lohtia et al. | ................ | 455/445 |
| 6,584,490 B1 * | 6/2003 | Schuster et al. | ............. | 709/200 |
| 6,594,349 B2 * | 7/2003 | Fortman | .................. | 379/88.14 |
| 6,910,210 B1 * | 6/2005 | Chew | ......................... | 718/103 |
| 2002/0069291 A1 * | 6/2002 | Tindal et al. | ................ | 709/233 |
| 2002/0083160 A1 * | 6/2002 | Middleton | .................. | 709/221 |

(Continued)

OTHER PUBLICATIONS

Huang,N.;Lee,W.;Pan,J. Providing Multicast Short Message Services over Self-routing Mobile Cellular Backbone Network,[retrieved Aug. 5, 2004]. Retrieved IEEE database[online]Global Telecommunications Conference,2001. GlobeCom '01 IEEE ,vol. 1, 25-29.*
"Digital cellular telecommunications system (Phase 2+); Technical realization of the Short Message Service (SMS); (GSM 03.40 version 7.4.0 Release 1998);" *ETSI TS 100 901 V7.4.0* (Dec. 1999), pp. 1-121.

*Primary Examiner*—Glenton B. Burgess
*Assistant Examiner*—Lashanya R Nash
(74) *Attorney, Agent, or Firm*—Merchant & Gould (57) ABSTRACT

A method and system for routing messages received by a device is described. The router routes messages to applications associated with a provider that recognizes an incoming message type. Providers register with the router to receive messages of a particular type. The providers are prioritized so that the router delivers messages to the providers based on the assigned priority. The router inquires with the providers in their relative assigned priority. The router stops inquiring the providers once an appropriate provider for the message has been found. If the message does not belong to the provider then the next provider is queried. Before delivering the message to the application, the provider formats the message to the specifications provided by the application.

20 Claims, 11 Drawing Sheets

U.S. PATENT DOCUMENTS

2002/0112014 A1* 8/2002 Bennett et al. .............. 709/206
2002/0116524 A1* 8/2002 Anson et al. ................ 709/240
2003/0016639 A1* 1/2003 Kransmo et al. ............ 370/335
2004/0116119 A1* 6/2004 Lewis et al. .............. 455/435.1

* cited by examiner

METHOD AND SYSTEM FOR ROUTING SMS MESSAGES

FIELD OF THE INVENTION

The present invention relates generally to computer software, and more particularly to routing messages for a wireless device.

BACKGROUND OF THE INVENTION

Short Messaging Service (SMS) is a service that allows short text/data messages to be sent and received on Global System for Mobile Communications (GSM) cellular networks. Generally, there are three types of SMS messages: GSM character set-encoded messages (effectively 7-bit encoded text), UCS2-encoded messages (Unicode encoded 16-bit text), and 8-bit binary-encoded messages. Typically, GSM-encoded messages and UCS2-encoded messages are textual and are displayed to the user by a messaging application as soon as they are received, whereas 8-bit binary-encoded messages are generally directed at providing device-specific information, such as device configuration messages.

SMS messages have a "User Data Header" which can contain additional information, such as source and destination port numbers (similar to TCP/IP), concatenation information (to support multi-part SMS messages), and the like. The User Data Header allows SMS messages to be customized.

Special characters or strings are often used in SMS messages to denote messages with special meanings. For example, a text message containing the string "!VM!5" might indicate that five voicemail messages are available. However, "!VM!5" would probably not be displayed directly to the user; instead, the message would cause the device's software to update its voicemail icon instead. Similarly, it is often possible to have e-mail redirected to a GSM mobile device through the use of a special e-mail address maintained by the GSM cellular service supplier. When the carrier receives an e-mail directed to this special address it generates an SMS message containing the same data as the e-mail message and sends the SMS message on to the user's mobile device via the cellular network. Such SMS messages often have a special layout that includes information about the original e-mail's sender and subject as well as the body of the original e-mail message. Ideally, the receiving device parses this special SMS message format and displays the information to the user in a convenient manner.

Supporting such rich messaging functionality requires that the device understand all of the different message types it might receive. However, there are many different formats already in use and there are many new formats being introduced regularly.

SUMMARY OF THE INVENTION

The present invention is directed at providing a system and method for an SMS message router. According to one aspect of the invention, the router routes messages to applications associated with providers. These providers are capable of recognizing particular message types and are associated with various applications on the device. The providers are prioritized so that the router delivers messages to the providers based on their assigned priority.

According to another aspect of the invention, the router receives the SMS messages delivered to the device and delivers them to the appropriate user-level application. The "appropriate" application is defined as the application that previously registered itself with the router to receive SMS messages of a particular type. For example, a mail application provider may register to receive all text messages; a configuration provider may register for all configuration messages, and so on.

According to yet another aspect of the invention, the router makes inquiries with the providers in order of their relative assigned priorities when an incoming message is received. If a message is not recognized by the current provider, then the next provider is queried. The router stops inquiring the providers once an appropriate provider for the message has been found.

According to still yet another aspect of the invention, the router informs an application associated with the provider that a message has been received. Before delivering the message to the application, the provider formats the message to the specifications provided by that provider and application.

DETAILED DESCRIPTION OF THE PREFERRED EMBODIMENT

The present invention is directed at providing a method and system for routing messages. Briefly described, the router provides the incoming message to a set of providers based on a priority level. Each provider looks for a specific type of SMS message; it accepts and processes only that type of message. Applications that are interested in that particular message type will register themselves with that particular provider.

Figure 1:
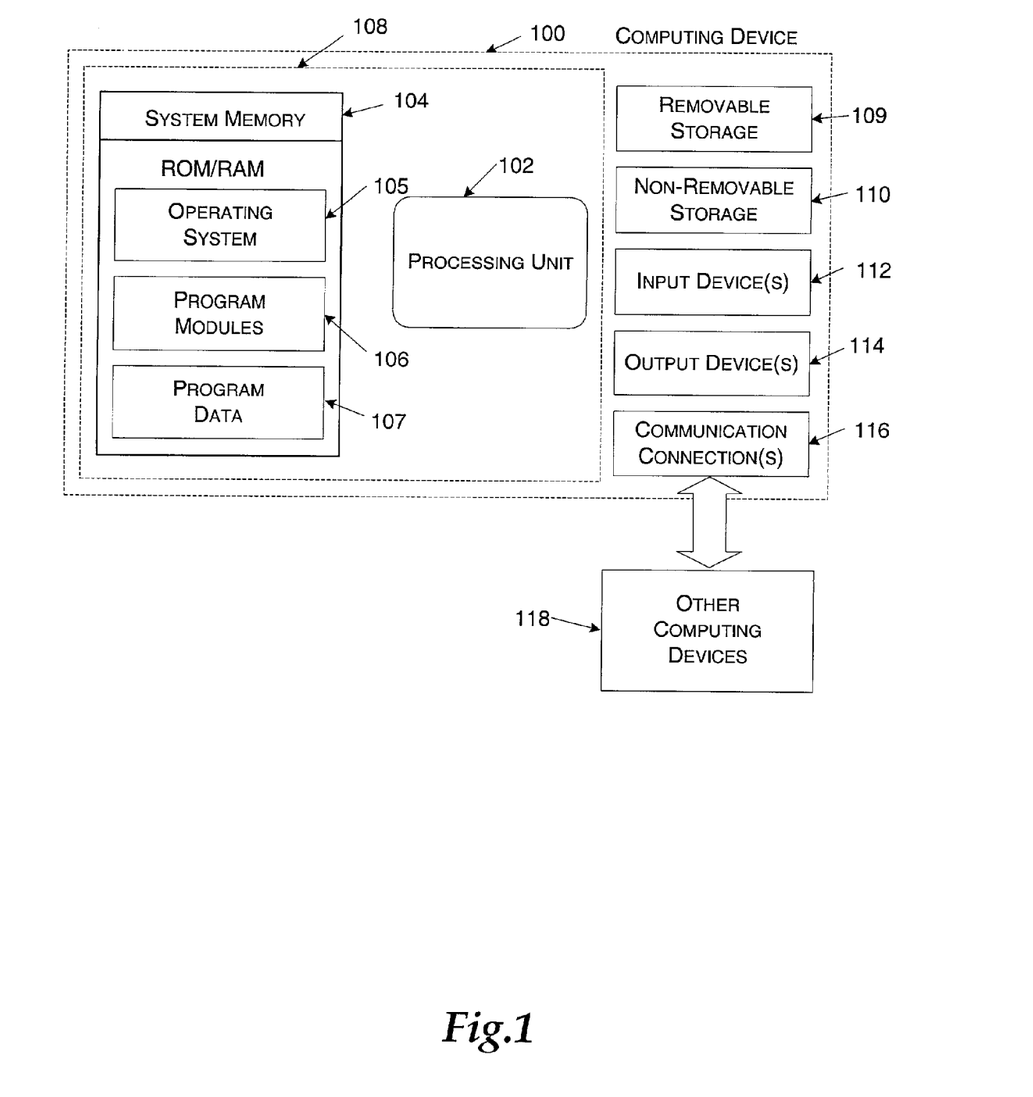
FIG. 1 is a functional block diagram of one computing device adapted to implement one embodiment of the invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
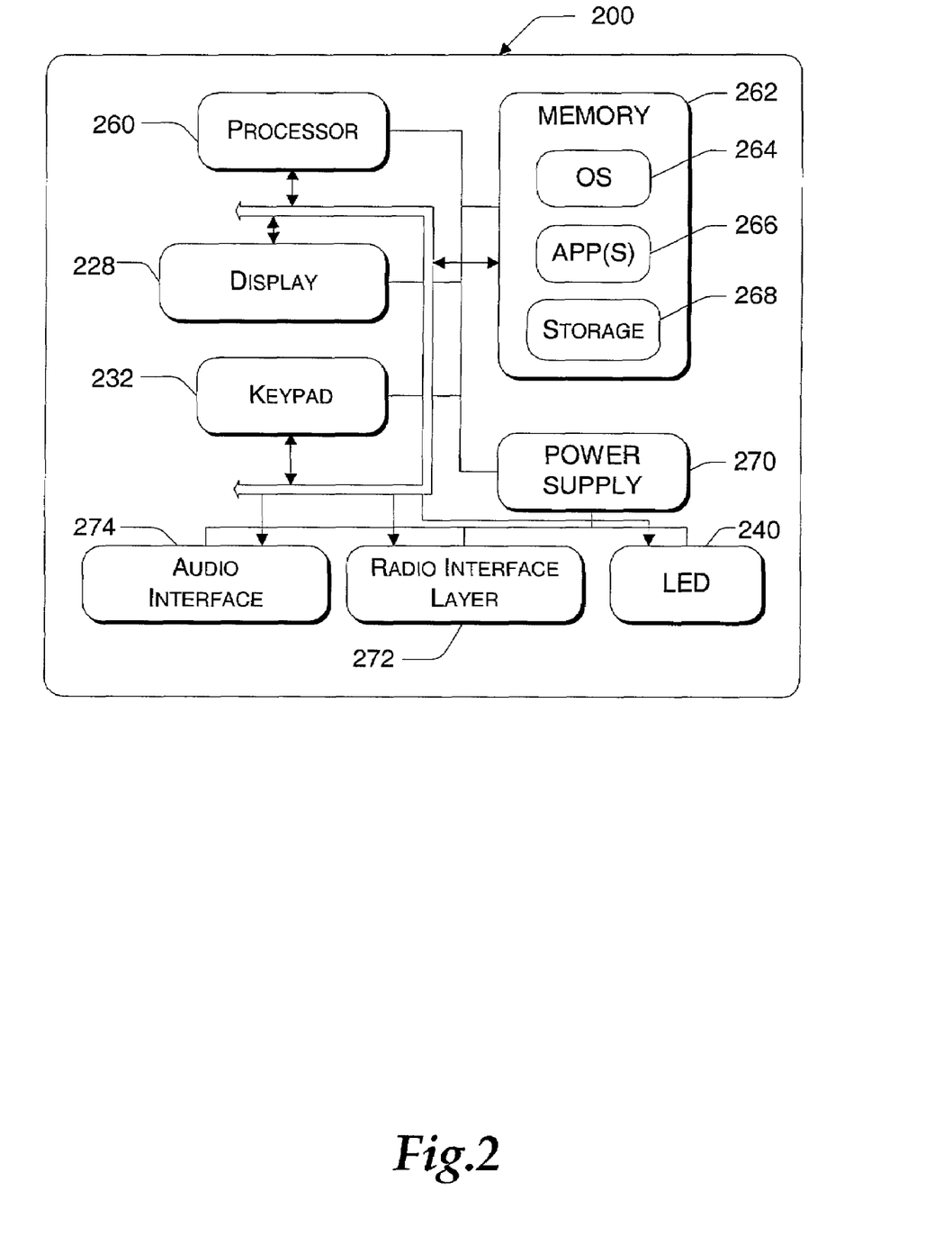
FIG. 2 is a functional block diagram illustrating a wireless device including a router adapted to implement one embodiment of the invention.

FIG. 2 is a functional block diagram illustrating a wireless device including a router adapted to implement one embodiment of the invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. A routing application also resides on the mobile computing device 200 and is programmed to route incoming messages to the appropriate programs.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Figure 3:
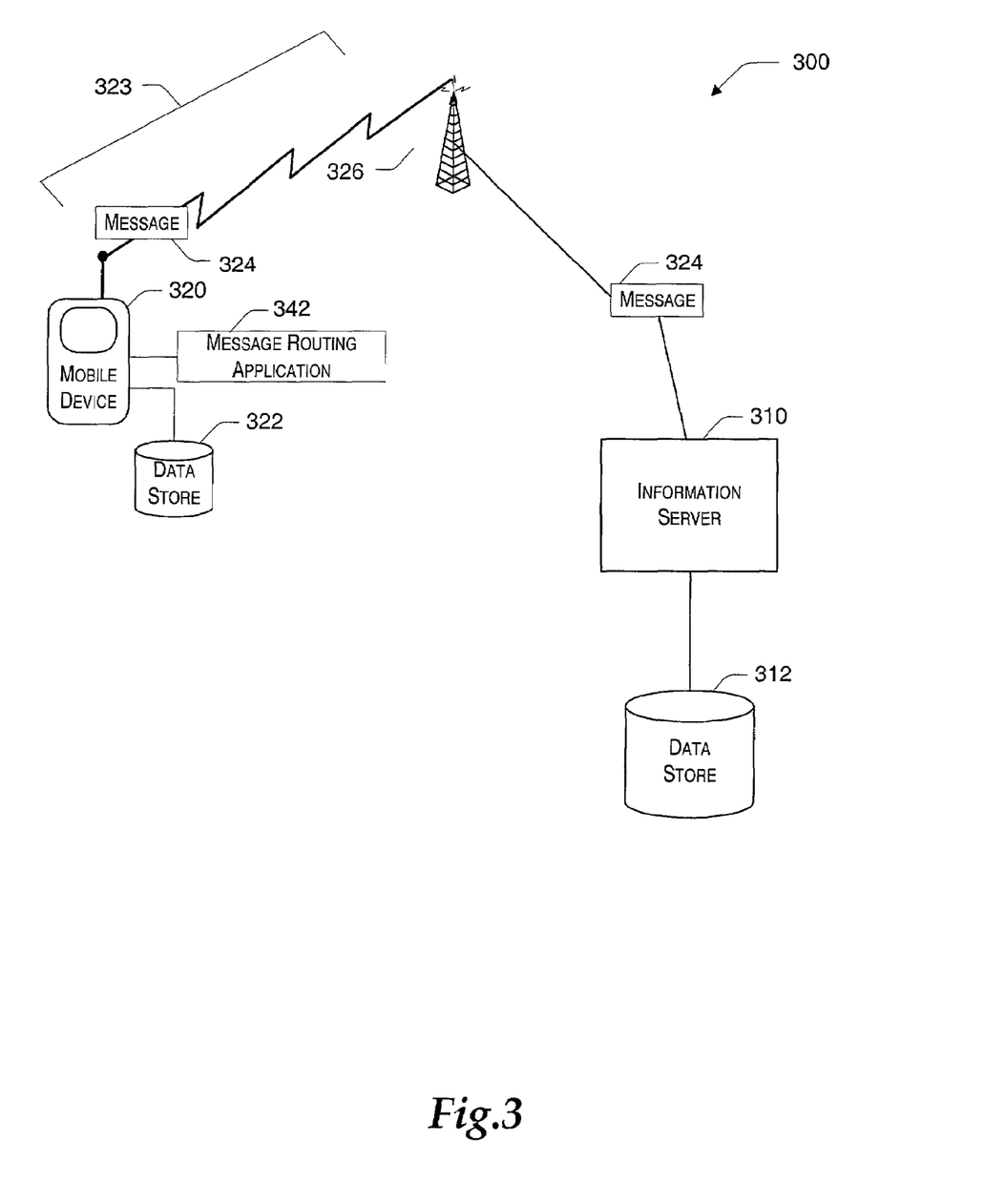
FIG. 3 is a functional block diagram of an exemplary router system as implemented using the computer device shown in FIG. 1 and the mobile computing device shown in FIG. 2.

FIG. 3 is a functional block diagram generally illustrating one embodiment for a message routing system 300 for routing messages between a fixed computing device, such as an information server 310 and a mobile device 320, in accordance with the present invention. In this implementation, the information server 310 is a computing device such as the one described above in conjunction with FIG. 1, and the mobile device 320 is a mobile computing device such as the one described above in conjunction with FIG. 2. Message routing application 342 routes incoming messages 324 sent by information server 310 and received by mobile device 320. In the embodiment illustrated, the message routing application 342 is resident on a mobile device 320, which is a computing device as described above in conjunction with FIG. 2. In another embodiment, the message routing application 342 may reside on information server 310.

The mobile device 320 maintains mobile data 322 locally in its storage 268 (shown in FIG. 2). As mentioned earlier, the mobile data 322 may include e-mail or other messages used by an e-mail application, contact information used by a PIM, appointment information used by a scheduling program, and the like.

Briefly, in the message routing session, message data is transmitted between the mobile device 320 and the information server 310 using wireless technology. The message data includes messages 324 sent by the information server 310 to the mobile device. The mobile device 320 receives the messages and routes each message to the appropriate provider and corresponding application(s).

Figure 4:
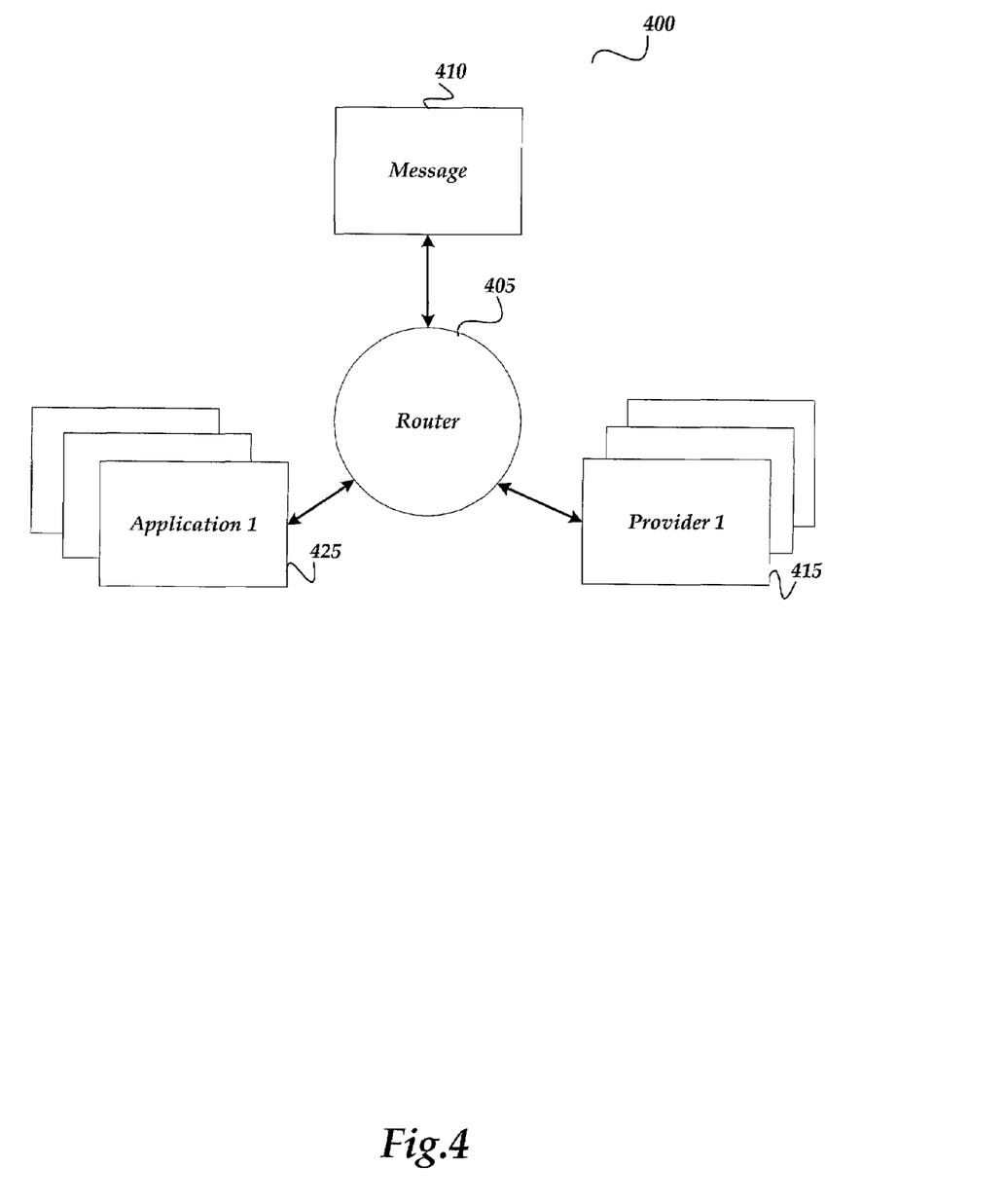
FIG. 4 illustrates a router system, according to one embodiment of the invention.

FIG. 4 illustrates a router system (400), according to one embodiment of the invention. A router (405) routes message(s) 410 within a wireless device. Router 405 receives incoming message 410 and provides access to message 410 to a set of providers 415 based on a priority level. A provider 415 is associated with each incoming message type. According to one embodiment of the invention, one provider 415 is associated with each message type. A default provider 415 may be provided to handle a message that is not identified by any of the other providers 415. Each provider 415 is associated with an application 425. Providers 415 may also be associated with more than one application. For example, a provider may be associated with an e-mail application and a calendar application. A provider may not be associated with any applications if no application is registered to receive messages of the type(s) recognized by the provider. In this case, messages aren't routed to that provider.

Figure 5:
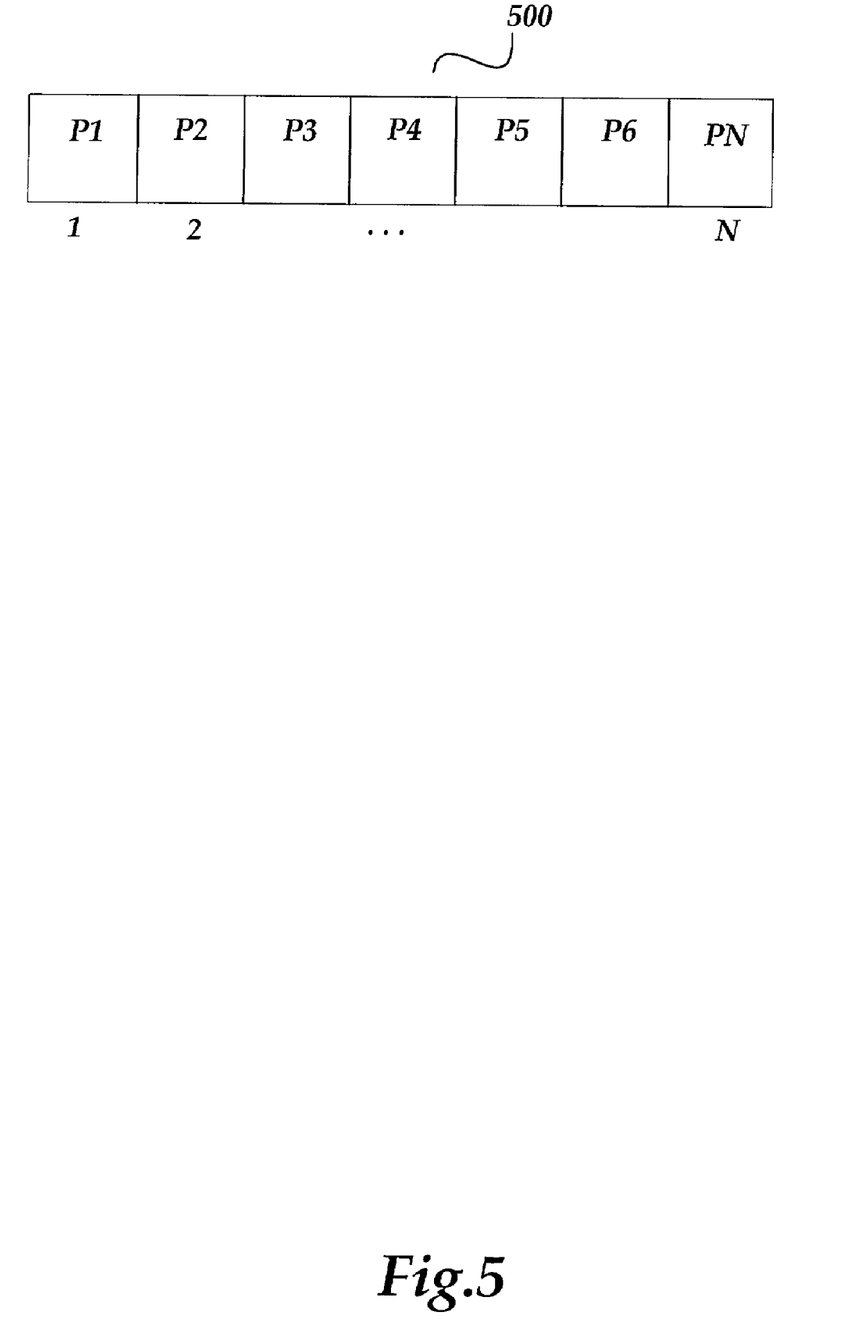
FIG. 5 shows a table illustrating prioritizing a set of providers, according to one embodiment of the invention.

FIG. 5 shows an exemplary table prioritizing a set of providers 500, according to one embodiment of the invention. Any number of providers may be registered with the router. For example, if there are one hundred different incoming message types there may be as many as one hundred providers, according to one embodiment of the invention. As discussed above, a default provider may be used to handle any message type that does not have a particular provider associated with the type.

Referring to FIG. 5, providers P1 through PN are prioritized from 1 to N, where one (1) is the highest priority level. A provider with the highest priority level is given access to the message before any lower level priority provider. In this particular example, provider P1 has the highest priority and provider PN has the lowest priority. As will be appreciated, the priority level of the provider may be assigned in any manner allowing a router to determine the order of priority among the providers. For example, the providers may be prioritized from highest to lowest, largest to smallest, and the like.

Figure 6A:
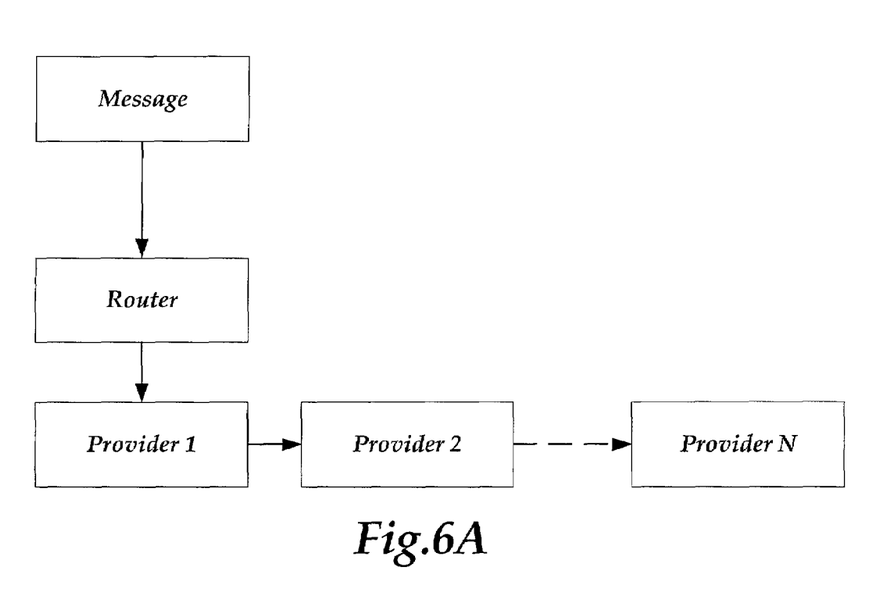
FIGS. 6A-6D illustrate a router system routing messages, according to one embodiment of the invention.

FIGS. 6A-6D illustrate a router system routing messages, according to one embodiment of the invention. FIG. 6A illustrates a message arriving at a router. The router has access to a set of N providers. According to one embodiment of the invention, each provider is associated with a particular message type.

Figure 6B:
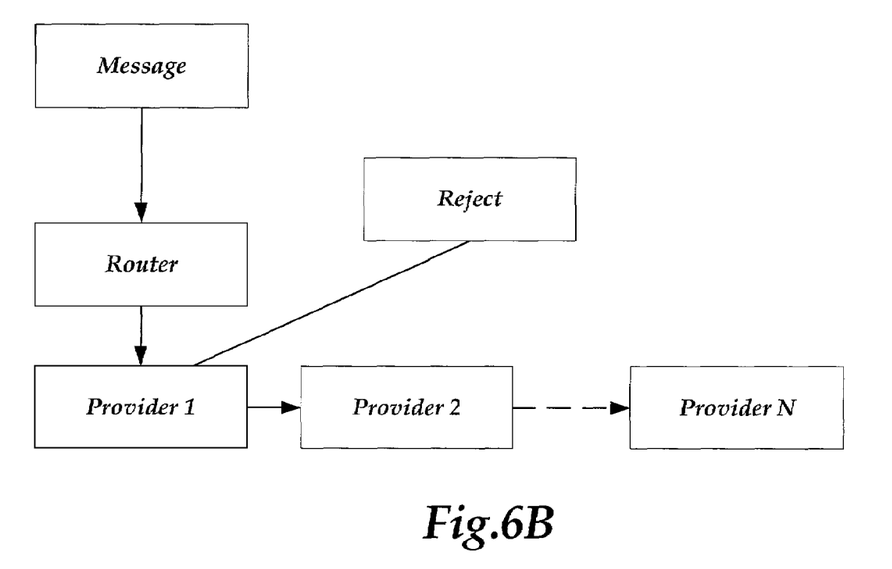

FIG. 6B illustrates a provider rejecting a message provided by the router. The router provides the incoming message to each provider, in order of priority, until a provider selects the message as belonging to the provider. In this particular example, an incoming message is received by a router and delivered to the provider having the highest priority. The message may be delivered to the provider in many different ways. For example, the router may place the message in a shared memory space; place the message in a memory space reserved for the particular provider, and the like. Once the provider has access to the message the provider has an opportunity to view the message to determine if it recognizes the message. If the message is recognized by the provider, the message is associated with the provider and the routing of the message stops. Otherwise, the provider indicates that the message is rejected, and the router provides access to the next provider having the next highest priority. In this particular example, the first provider does not recognize the message and rejects the message.

Figure 6C:
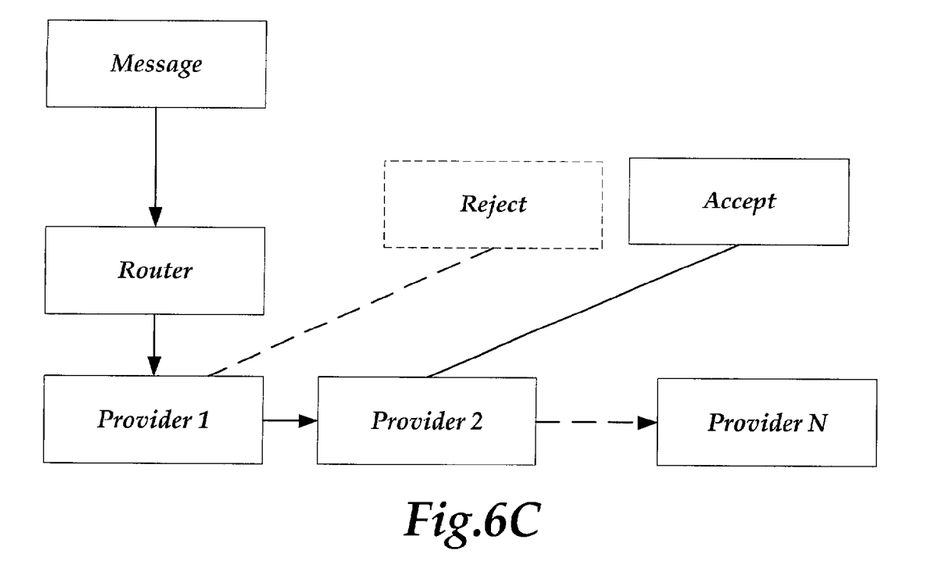

FIG. 6C illustrates a provider recognizing a message. The message is received by the router and delivered to the providers in the order of priority until it is recognized. As discussed above in FIG. 6B, provider 1 rejected the message. When the provider indicates that it does not recognize the message, the router provides the next provider with access to the message for recognition. In this example, provider 2 recognizes the message and indicates to the router that it accepts the message. The router associates the message with the provider that accepted the message, which in this case is provider 2, and stores the message for later retrieval. In another embodiment of the invention, the message is delivered to the application once the provider has recognized the message. For purposes of clarification, if provider 2 had not recognized the message, the router would provide the message to each provider, in order of priority, until a provider recognized the message. If no provider recognizes the message a default provider handles the message. In another embodiment, the message could be discarded, or an error code returned to the sender of the message.

Figure 6D:
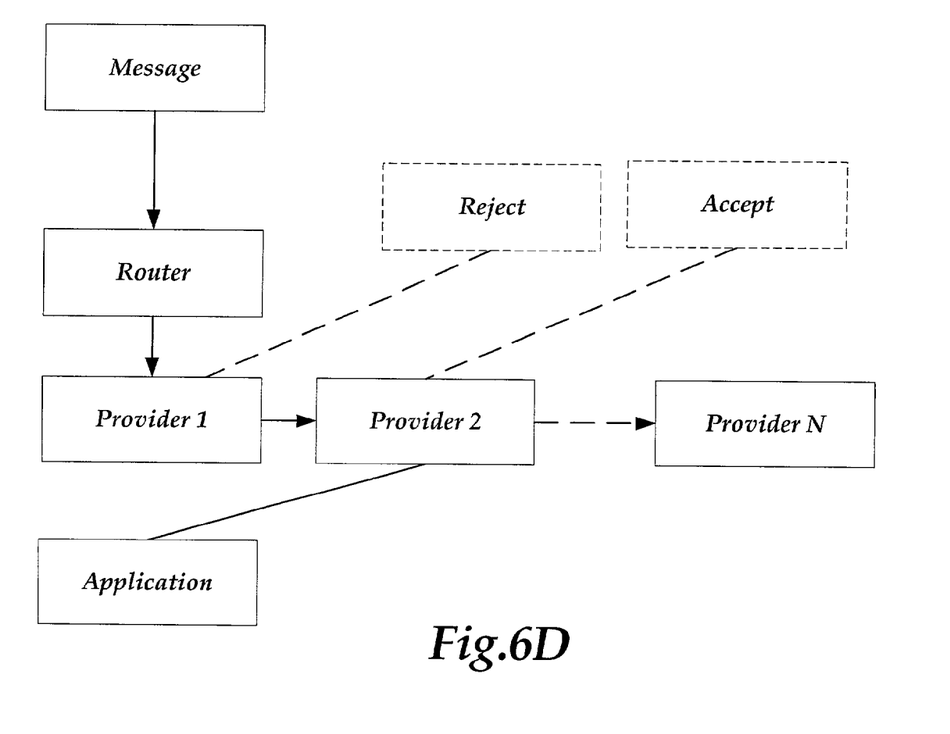

FIG. 6D illustrates the message associated with a provider being delivered to an associated application. Each provider has at least one associated application with the message. As discussed in FIGS. 6B and 6C, provider 1 rejected the message and provider 2 accepted the message. When the provider informs the router that it recognizes ("accepts") the message the applications associated with the identifying provider are notified. Within some time period after notification the associated applications may request delivery of the message. The message may be kept for any amount of time. For example, the router may keep the message for five minutes, one hour, a day, a week, a year, and the like. When the application requests the message, the router directs the provider associated with the message to prepare it for delivery to the requesting associated application. Preparation may include removing identifying characters specific to the message type, formatting the message for the particular application, decompressing the message, and the like. The router then delivers the prepared message to the application. According to another embodiment, the provider itself can deliver the message to the requesting application.

Figure 7:
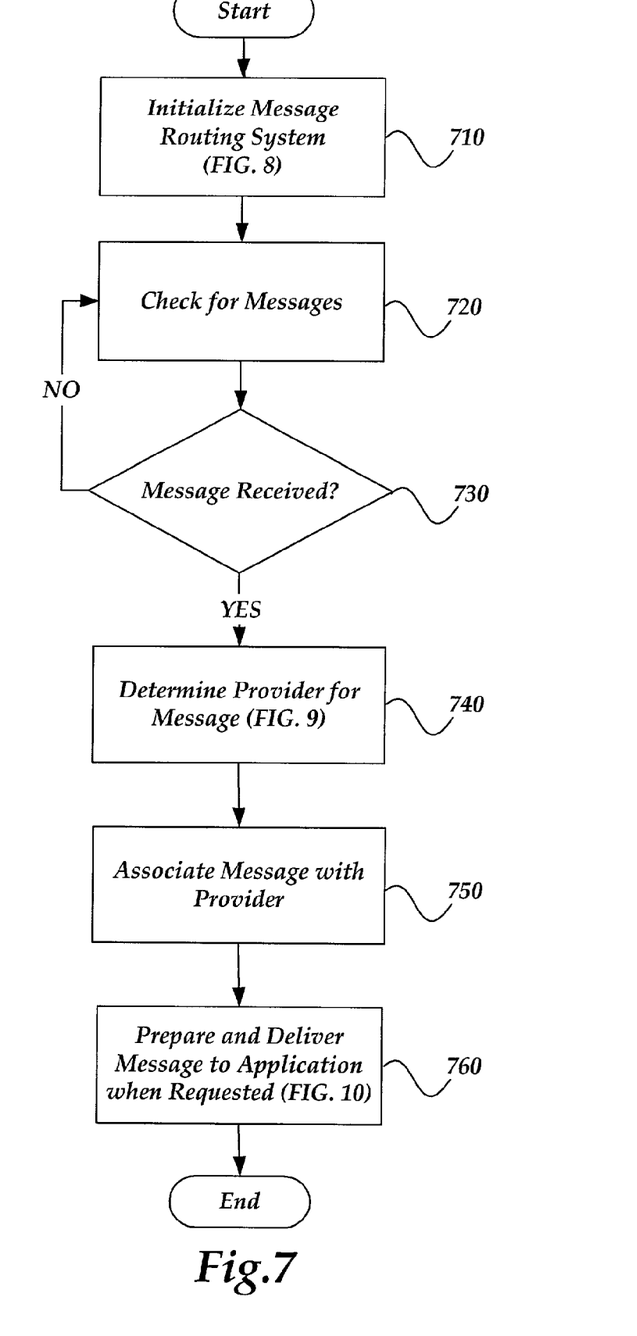
FIG. 7 is an overview flowchart illustrating routing messages, according to one embodiment of the present invention.

FIG. 7 illustrates an overview logical flow for routing incoming messages. Starting at a block 710, the message routing system is initialized (See FIG. 8 and related discussion). According to one embodiment of the invention, the device receives SMS messages. At a block 720 the device checks for incoming messages. Moving to a decision block 730, a determination is made whether the device has received a message. When a message has not been received, the logical flow returns to a block 720 to continue checking for messages. When a message has been received, the logical flow moves to block 740 at which point a provider is associated with the message (See FIG. 9 and related discussion). Transitioning to a block 750, the message is associated with the provider recognizing the message. Next, at a block 760, the message is delivered to the application(s) associated with the provider when requested (See FIG. 10 and related discussion). The logical flow then ends.

Figure 8:
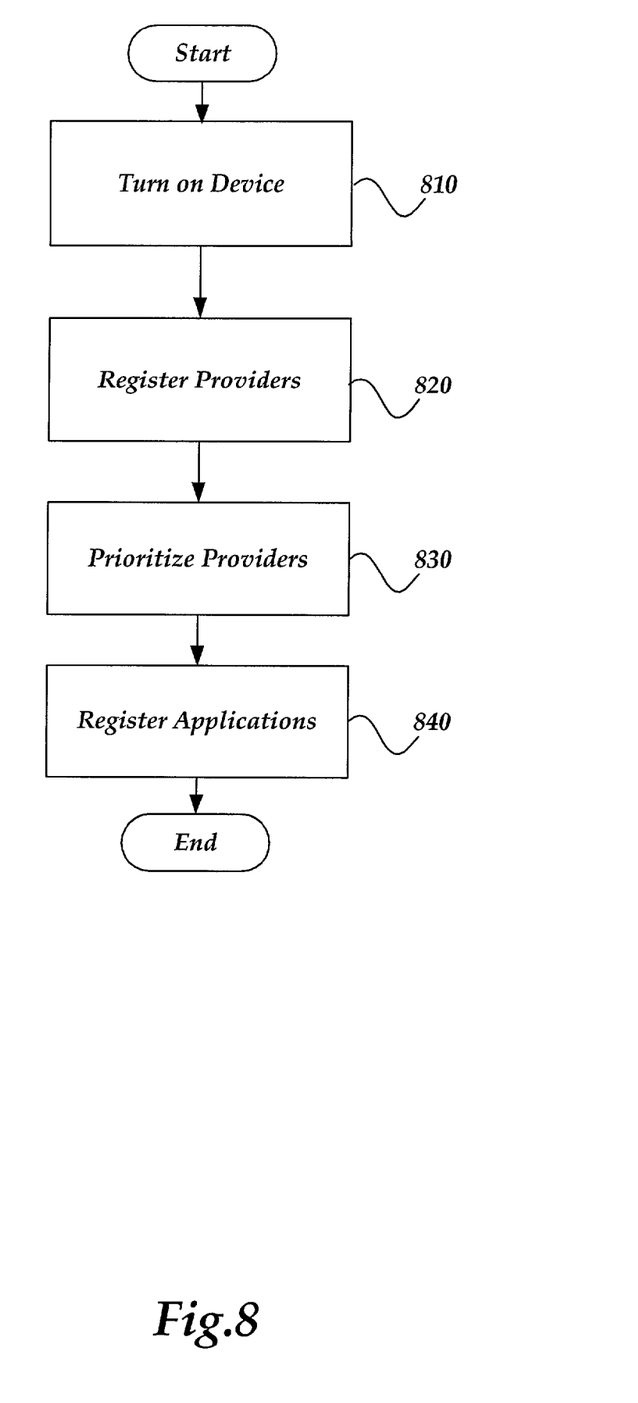
FIG. 8 illustrates a logical flow for initializing a message routing system, according to one embodiment of the invention.

FIG. 8 shows a logical flow for initializing a message routing system according to one embodiment of the invention. Starting at a block 810, the device is powered on. Moving to a block 820, providers are registered. According to one embodiment, providers are registered with the router through the use of entries in the device's registry. As will be appreciated by those of ordinary skill in the art, the providers may be registered with the router in many different ways. For example, the providers may register with the device by placing provider information in a file or memory location on the device. According to one embodiment of the invention, providers are separate dynamic link libraries (DLL's). According to another embodiment, the providers may be contained in a single DLL. Additionally, the providers may be contained in hardware or software located on the portable device, as is well known to those of ordinary skill in the art. Transitioning to a block 830, the registered providers with the device are prioritized. According to one embodiment of the invention, the registry entries include information representing the providers' priorities relative to each other so that the providers may be placed into a list sorted by priority ordering. For example, if there are ten providers, each provider will be assigned a priority from one to ten. According to one embodiment of the invention, each provider is assigned a unique priority and priority one is the highest priority. In other embodiments of the invention, the providers could be ranked in other manners known to those skilled in the art. Applications also register with the router to receive messages identified by a provider. For example, a mail application may register to receive all text messages; a configuration application to receive all configuration messages, and so on.

Figure 9:
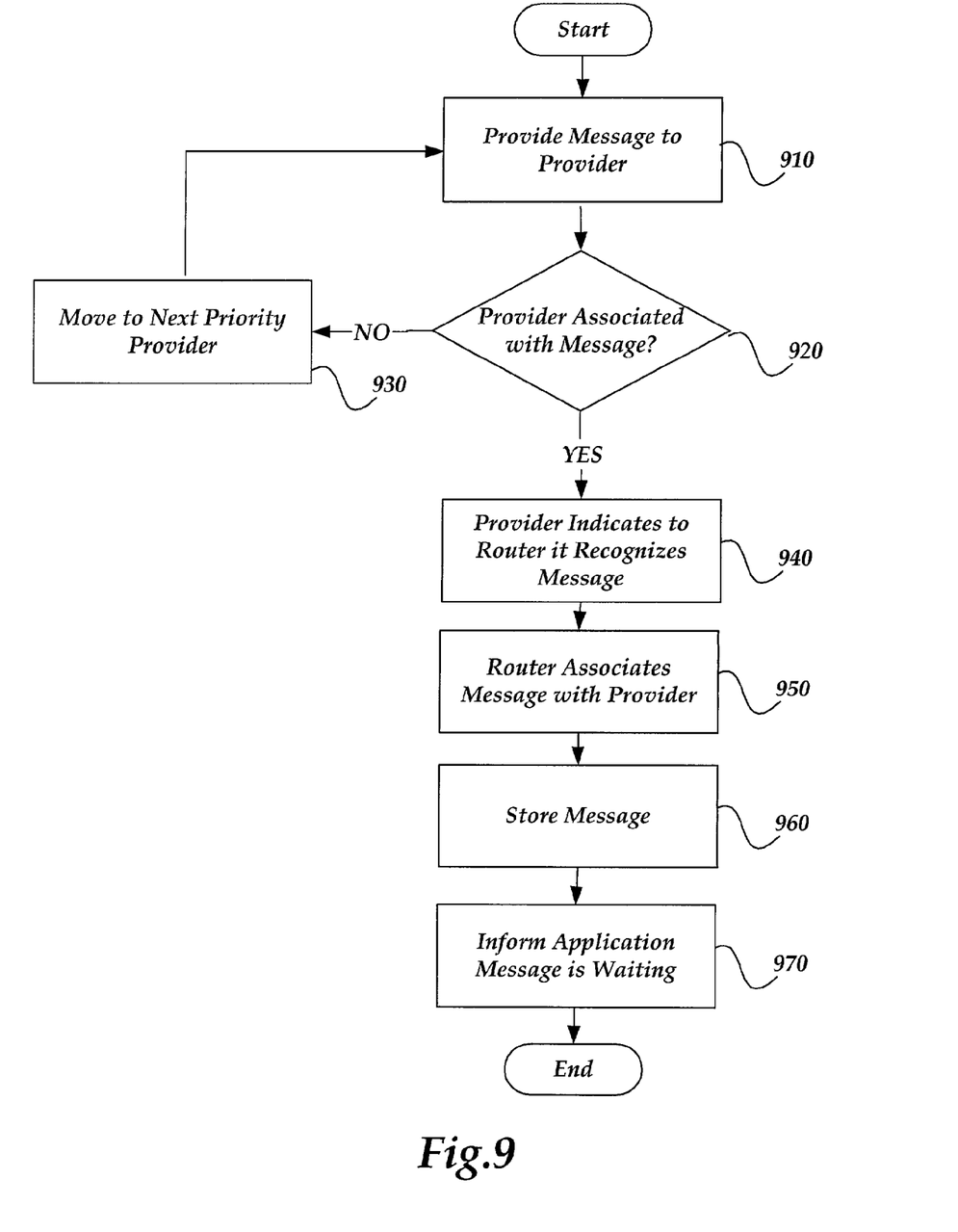
FIG. 9 illustrates a logical flow for routing messages to a provider, according to one embodiment of the invention.

FIG. 9 illustrates a logical flow for routing messages to a provider. According to one embodiment of the invention, the router receives all of the messages delivered to the device and delivers the messages to the applications associated with the provider registered to receive the particular message type. For example, there may be a message type for an e-mail program, another for a calendar program, another for a contacts program, and so on. Starting at a block 910, the message is provided to the provider having the highest priority that has not yet determined if it recognizes the message. At a decision block 920, a decision is made as to whether the provider recognizes the message. For example, if a provider has registered to receive all messages starting with a character sequence beginning with "\\++", that provider will access the message and determine if the character sequence begins with those characters. If the message begins with the character sequence the provider will recognize the message. Otherwise, the provider will not recognize the message. If the provider does not recognize the message, the router moves to the next provider (block 930). According to one embodiment of the invention, this next provider is the provider having the next highest priority value. If the provider recognizes the message, logical flow moves to a block 940, at which point the provider indicates to the router that it recognizes the message. According to one embodiment, the lowest priority provider recognizes ALL messages. The router associates the message with the provider that has recognized the message (block 950) and stores the message for later recall by the application(s) associated with the provider (block 960). According to one embodiment, the message is stored in a location associated with the provider. As will be appreciated, there are many locations the message may be stored. For example, the message may be stored in a data structure associated with the message, a free block of memory in the device, in an EPROM, and the like. Moving to a block 970, the router informs the application(s) associated with the provider that recognized the message that a message is waiting. The logical flow then ends.

Figure 10:
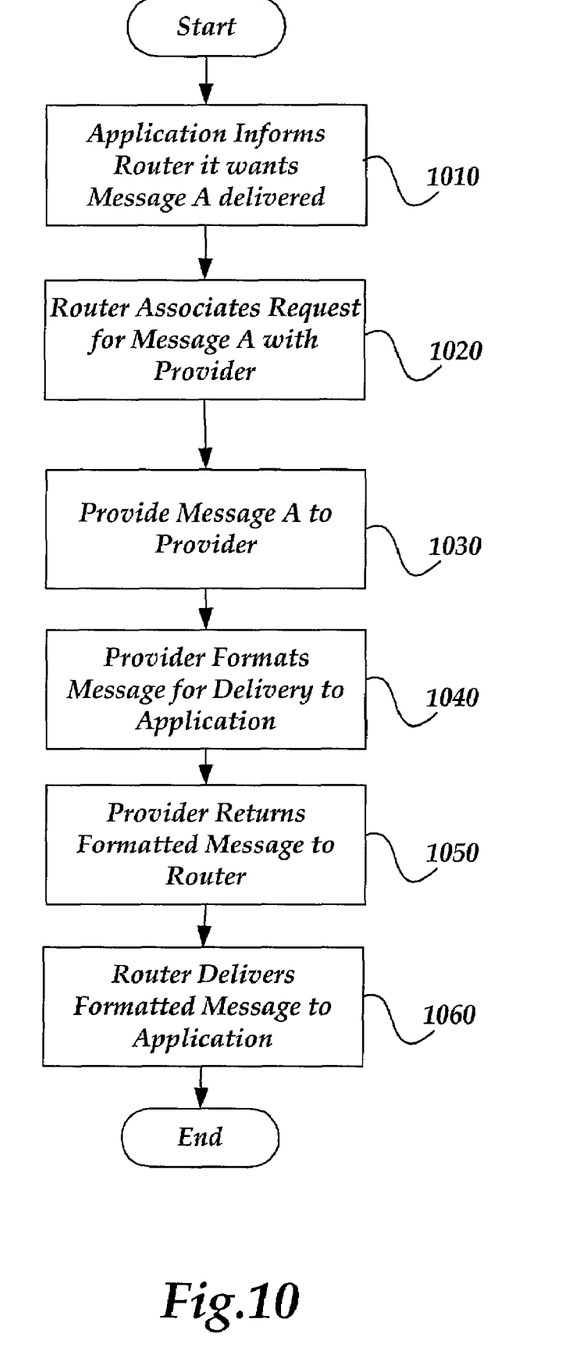
FIG. 10 is a flowchart illustrating preparing and delivering a message to an associated application after it has been recognized by a provider.

FIG. 10 is a flowchart illustrating preparing and delivering a message to an associated application after it has been recognized by a provider. Starting at a block 1010, an application associated with a provider informs the router that it wants a specific message delivered to it. At block 1020, the router associates the request to deliver the message to the application with the provider that originally identified this message. The router stores the information correlating each identified message with the provider that identified the message. Transitioning to a block 1030, the router provides the message to the provider. According to another embodiment of the invention, the router notifies the provider that the application is requesting the message. In other words, the router does not deliver the message to the provider. Instead, the provider has stored the message and is notified to access the message. Next, at a block 1040, the provider formats the message for delivery to the requesting application. For example, if the message is delivered to the mail program, the provider formats the message to the requirements of the mail program. If the message is to be delivered to a text editor, the message is formatted for delivery to the text editor. As will be appreciated, the message may be formatted in many different ways depending on the requirements of the application and the specifications of the provider. The provider returns the formatted message to the router (block 1050). According to one embodiment of the invention, the message may be formatted by the application requesting the message, or the router. The router then delivers the message to the application (block 1060). According to one embodiment, the message is delivered to the application by storing the message in a data structure specific to the identifying provider. As will be appreciated the message may delivered in any manner known to those skilled in the art.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for routing messages, received by a mobile device, to an application of the mobile device, comprising:

accessing a registry of the mobile device, wherein the registry includes data that indicates a priority of each of the plurality of prioritized providers with respect to one another;

providing a plurality of prioritized providers on the mobile device in accordance with the priority indicated by the registry of the mobile device, wherein each provider is associated with a message type;

receiving a message on the mobile device, the message having a message type identified by a character sequence;

routing, on the mobile device, the message to the plurality of prioritized providers on the mobile device, wherein the provider with the first highest priority receives the message first;

routing the message to the provider with the second highest priority when the provider with the first highest priority does not recognize the message type;

associating the message with at least one of the plurality of prioritized providers when the at least one of the plurality of prioritized providers recognizes the message type;

associating the message with a default provider associated with a lowest priority when at least one of the plurality of higher prioritized providers does not recognize the message type;

informing an application of the mobile device and associated with the provider that the message is waiting without the application sending a query to receive an indication that the message is waiting; and formatting the message to the requirements of the application, wherein formatting the message to the requirements of the application comprises removing the character sequence identifying the message type.

2. The method of claim 1, further comprising:
waiting for the application to request the message; and
delivering the message to the application.

3. The method of claim 2, wherein associating the message with a provider, further comprises:
providing the message to a provider based on a priority level; and
determining if the prioritized provider is associated with the message.

4. The method of claim 3, wherein the provider has a unique priority level.

5. The method of claim 4, wherein determining if the prioritized provider is associated with the message, further comprises:
receiving a response from the prioritized provider indicating if the prioritized provider is associated with the message; and
associating the message with the prioritized provider if the received response indicates that the prioritized provider is associated with the message.

6. The method of claim 5, wherein associating the message with the prioritized provider if the received response indicates that the prioritized provider is associated with the message, further comprises storing the message in a location associated with the prioritized provider.

7. A computer storage media having computer executable instructions for routing messages, received by a mobile device, to an application of the mobile device, comprising:
accessing a registry of the mobile device, wherein the registry includes data that indicates a priority of each of a plurality of prioritized providers with respect to one another; providing a plurality of prioritized providers on the mobile device in accordance with the priority indicated by the registry of the mobile device, wherein each provider is associated with a message type;
receiving a message, on the mobile device, having a message type indicated by a character sequence in the message;
routing the message to a first prioritized provider on the mobile device from a list of prioritized providers on the mobile device;
associating the message with the first prioritized provider when the first prioritized provider recognizes the character sequence, wherein an application of the mobile device and associated with the first prioritized provider is informed that the message is waiting without the application sending a query to receive an indication that the message is waiting;
formatting the message to the requirements of an application associated with the first prioritized provider, wherein formatting the message to the requirements of the application comprises removing the character sequence indicating the message type;
routing the message to a second prioritized provider when the first prioritized provider does not recognize the character sequence; and
associating the message with a default provider associated with a lowest priority when at least one of the plurality of higher prioritized providers does not recognize the message type.

8. The computer storage media of claim 7, wherein associating the message with the first prioritized provider further includes further comprising:
waiting for the application to request the message; and
delivering the message to the application.

9. The computer storage media of claim 8, wherein formatting the message to the requirements of the application further comprises:
providing access to the message to the first prioritized provider associated with the requesting application; and
the first prioritized provider associated with the requesting application formatting the message to the requirements of the application.

10. The computer storage media of claim 8, wherein associating the message with a provider, further comprises:
prioritizing the list of providers based on a priority level; and
providing access to the message to each of the prioritized providers in order of priority until the message has been associated.

11. The computer storage media of claim 10, wherein each of the set of providers has a unique priority level.

12. The computer storage media of claim 11, wherein providing access to the message to each of the prioritized providers in order of priority until the message has been associated, further comprises:
receiving a response from the highest level prioritized provider indicating if the prioritized provider is associated with the message; and
associating the message with the highest level prioritized provider if the received response indicates that the prioritized provider is associated with the message.

13. The computer storage media of claim 12, wherein associating the message with the prioritized provider if the received response indicates that the prioritized provider is associated with the message, further comprises storing the message in a location associated with the prioritized provider.

14. A system for routing messages received by a mobile device to an application of the mobile device, comprising:
a processor and a computer storage media;
computer readable instructions stored on the computer storage media and executing on the processor;
a communication connection device operating under the control of computer readable instructions; and
a routing device operating under the control of the computer readable instructions and operative to perform actions, including:
accessing a registry of the mobile device, wherein the registry includes data that indicates a priority of each of a plurality of prioritized providers with respect to one another;
providing priority to the plurality of prioritized providers in accordance with the priority indicated by the registry of the mobile device, wherein each provider is associated with a message type;
recognizing a character sequence indicating the message type;
receiving a message on the mobile device having a provider indicator;
routing the message until at least one provider on the mobile device recognizes the provider indicator, wherein the message is routed according to a priority level of the provider, wherein the provider having the first highest level of priority receives the message first, and wherein the message is routed to a provider having a second highest level of priority when the provider having the first highest level of priority does not recognize the provider indicator;

associating the message with at least one provider when the at least one provider recognizes the provider indicator;

associating the message with a default provider associated with a lowest priority when at least one of the plurality of higher prioritized providers does not recognize the message type;

formatting the message to the requirements of an application associated with the at least one provider, wherein formatting the message to the requirements of the application comprises removing the character sequence indicating the message type;

delivering the message to an the application of the mobile device and associated with the at least one provider when the at least one provider recognizes the provider indicator, wherein the application is informed that the message is waiting without the application sending a query to receive an indication that the message is waiting.

15. The system of claim 14, wherein the routing device is further operative to perform actions, including:
waiting for the application to request the message.

16. The system of claim 14, wherein associating the message with a provider, further comprises:
providing the message to a provider based on a priority level; and
determining if the prioritized provider is associated with the message.

17. The system of claim 16, wherein determining if the prioritized provider is associated with the message, further comprises:
receiving a response from the prioritized provider indicating if the prioritized provider is associated with the message; and
associating the message with the prioritized provider if the received response indicates that the prioritized provider is associated with the message.

18. The system of claim 17, wherein associating the message with the prioritized provider if the received response indicates that the prioritized provider is associated with the message, further comprises storing the message in a location associated with the prioritized provider.

19. The system of claim 14, wherein formatting the message for the application further comprises:

providing access to the message to the provider associated with the requesting application; and
the provider associated with the requesting application formatting the message to the requirements of the application.

20. A computer-implemented method for routing messages, received by a mobile device, to an application of the mobile device, comprising:
accessing a registry of the mobile device, wherein the registry includes data that indicates a priority of each of the plurality of prioritized providers with respect to one another;
providing a plurality or providers on the mobile device in accordance with the priority indicated by the registry of the mobile device, wherein each provider is associated with a message type and at least one application of the mobile device;
prioritizing the plurality of providers, wherein the plurality of providers are prioritized from a high priority to a low priority;
receiving at least one message including a provider character sequence;
routing the at least one message to the prioritized plurality of providers until one of the plurality of providers recognizes the provider character sequence, wherein the message is routed to each of the providers in order of priority;
routing the message to a default provider associated with a lowest priority when at least one of the plurality of higher prioritized providers does not recognize the provider character sequence;
indicating that the message is recognized;
associating the recognized message with the recognizing provider;
informing an application that the message is waiting without the application sending a query to receive an indication that the message is waiting;
requesting, by the application, delivery of the message;
associating the request with the recognizing provider;
formatting the message for the application, wherein formatting the message for the application comprises removing the character sequence indicating the provider; and
delivering the formatted message to the application.

* * * * *